Patented Oct. 16, 1928.

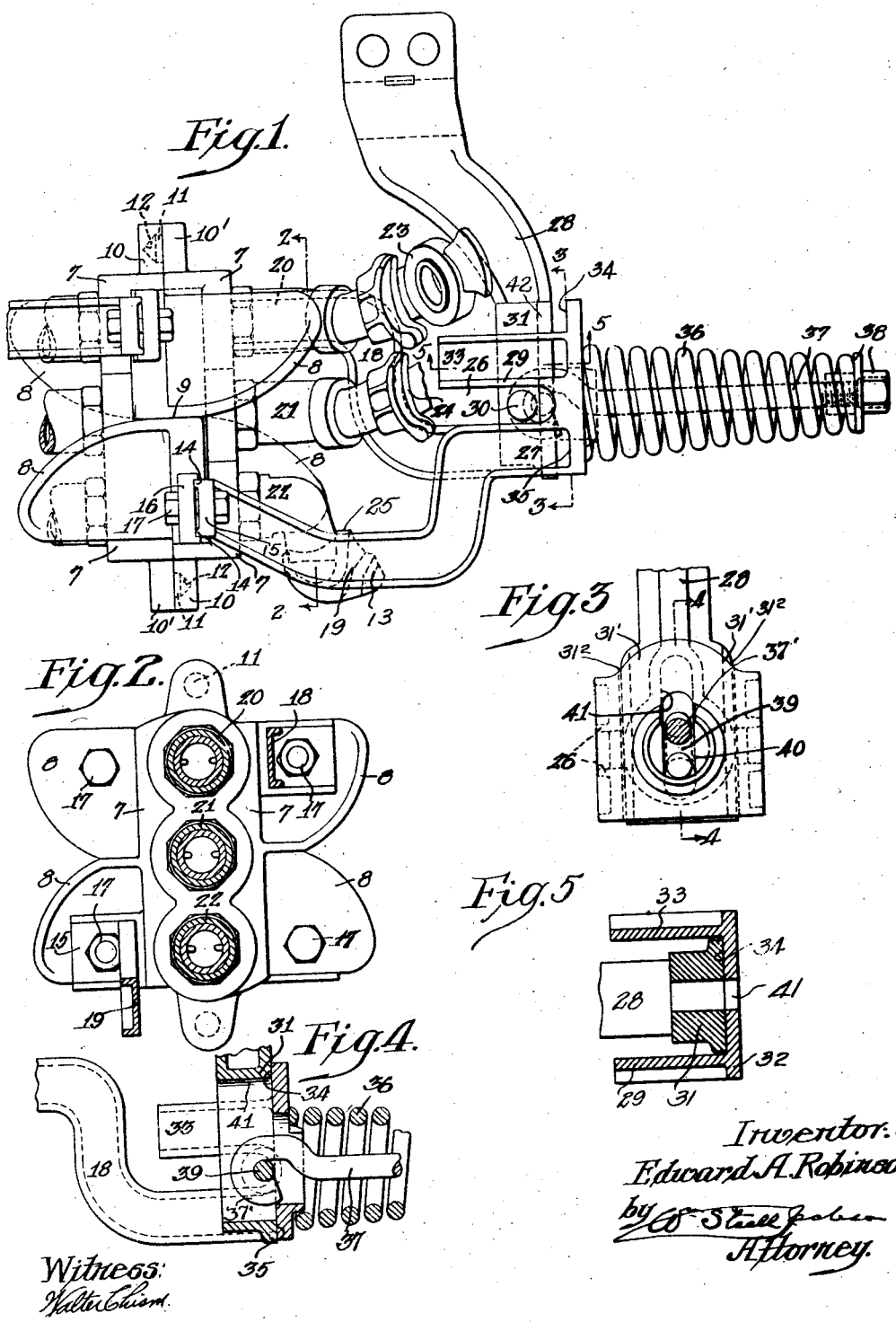

1,687,893

UNITED STATES PATENT OFFICE.

EDWARD A. ROBINSON, OF MONTREAL, QUEBEC, CANADA, ASSIGNOR OF ONE-HALF TO HIMSELF AND ONE-HALF TO ELLISON E. WORKMAN, OF MONTREAL, CANADA.

AUTOMATIC TRAIN-PIPE CONNECTER.

Application filed May 17, 1922. Serial No. 561,707.

My invention relates to automatic connecters intended for uniting the train pipes of meeting cars.

The main purpose of my invention is to afford a maximum of strength and convenience in the joining of a retaining bolt for a buffer spring to the bracket upon which it is to be supported.

A further purpose is to reduce the expense of manufacture and to improve the engagement between the head supporting yoke or carrier and the head itself.

A further purpose is to provide for gathering of the mating heads by laterally disposed wings or ears and to secure final exact placing of the two heads with respect to each other by preferably vertically disposed positioning members having but very slight gathering range.

A further purpose is to lower the connection between a connecter head and the bracket to facilitate access to the train pipes and terminals from the side.

A further purpose is to channel the members of a carrier or yoke for the head with a view to obtaining stiffening and guiding surface with a minimum of weight.

Further purposes will appear in the specification and in the claims.

I prefer to illustrate my invention by but one form, selecting a form which is practical, efficient and reliable and which at the same time well illustrates the principles of my invention.

Figure 1 is a broken side elevation showing the preferred form of my invention in coupling position.

Figures 2 and 3 are sections upon lines 2—2 and 3—3 respectively of Figure 1.

Figure 4 is a section upon line 4—4 of Figure 3.

Figure 5 is a section taken upon line 5—5 of Figure 1, omitting the spring.

In the drawings similar numerals indicate like parts.

I provide the head 7 with the usual gathering prongs or ears 8 staggered upon opposite sides. In such structures dependence has been placed largely upon the mating of the prongs of opposite heads along some such line as 9 to insure accurate vertical placing of the heads. Though this is satisfactory in the main, in that it brings the parts reliably to a close approximation of exact mating position, it is desirable to have further correction for any slight displacement which may still exist. As this displacement is most likely to be vertical I place the correcting devices at the top and bottom beyond the terminals, and show the heads as extended at 10, 10' to carry cooperating pins 11 and sockets 12, which have no substantial gathering range but which interfit to guide and correct for relatively slight displacements. On account of the distance between them they also secure very accurate angular placing of the heads.

In order to require as little fitting and as firm contact between the head and the feet of a supporting yoke or carrier 13 as possible, I terminate one of the mating parts, shown as the yoke or carrier, in ribs 14 located along the outer edges of right-angular feet 15 and seat these ribs upon the other part, namely, upon the lugs or bosses 16, which are rigid with the head and preferably are supported back of the wings. These parts are bolted together at 17, between the ribs.

The yoke or carrier is shown as staggered for the connection of the head and having the lower of its two legs 18, 19, quite low, preferably depressed below the point of attachment with the head, to give additional room for access to the train pipe connecting parts or terminals shown here conventionally as comprising terminals 20, 21, 22, suitable fittings and Westinghouse couplers 23, 24 and Gold coupler 25. The upper leg 18 is extended some distance from the head at a high level and is then dropped to the level of the rear of the leg 19.

The rib contact between the legs and the head very much reduces the amount of machining or grinding required for firm seating of the parts.

The legs 18, 19 are channeled for greater strength and for additional bearing surface on the pins 30 with the channels facing outwardly, and this channeling is extended about the slots 26 at the rear on both sides of the yoke body 27 adjacent the bracket 28. This gives additional strength and bearing surface (by reason of the width of the heads or flanges 29 at the edge of the slot) for the pins 30, which guide the movement of the body with respect to the bracket. This construction permits swinging of the head and yoke carrier about the bracket both in horizontal and vertical planes, and hence secures a substantially universal joint connection between the carrier and the lower end of the bracket.

In order to accommodate this relative movement, the forward parts of the sides 31 of the bracket are relieved so that the bracket is narrower at the front 31' than at the rear 31².

The effective body of the yoke or carrier comprises principally the rear portions of the legs, a plate 32 joining the two legs, and forwardly extending prongs 33 extending from the plate 32. The legs and the prongs are spaced to define the slots 26.

The forward (inner) face 34 of the plate 32 is adapted to rest against the rearward face 35 of the bracket and both are preferably flattened in order to give proper direction to the head when the yoke or carrier is forced forward to bring the plate 32 against the rear of the bracket.

The plate 32, and hence the yoke or carrier of which it forms a part, is held against the rear of the bracket by a buffer spring 36 resting against the rear of the plate and held tightly against it by the bolt 37 and nut and washer 37'.

The bolt 37 is hooked at its forward end at 38 and passes about a shank or neck 39 joining the sides 40 of a vertical slot 41 in the lower end of the bracket. The slot 41 is elongated above the neck to permit the hook to pass through it and the hole in the plate 32 may likewise be elongated for similar purposes if desired. The shank or neck 39 is thinnest at the middle and thickens toward its side supports so as to present a longitudinally curved exterior as seen in Figure 3, adapting it to be fitted by the hook. This gives great strength to transverse strain applied through the hook, while permitting swinging of the hook about the shank.

The plate 32 is provided with a rearwardly facing rim 42 adapted to position the forward end of the spring 36.

The earlier part of the gathering operation is exactly like that taking place with a number of existing heads. The side wings or prongs direct the opposite heads into nearly exact position. The pins then perform the final positioning function.

The head and yoke carrier are rigidly secured to each other and move as if integral. Their normal position is determined by the engagement of the inner face of the transverse plate at the rear of the carrier with the rear face of the bracket. With the engagement of the head with a mating head the yoke is pressed rearwardly against the pressure of the spring and is free to rock in any direction—within predetermined limits—when the plate is separated from the head.

It will be obvious that my disclosure herein will suggest to those skilled in the art various ways in which part or all of the benefit of my invention may be secured without copying the construction shown and it is my purpose to cover herein all such forms as come within the reasonable spirit and scope of my claims.

Having thus described my invention, what I claim as new and desire to secure by Letters Patent is:—

1. In an automatic train pipe connecter, a bracket, a yoke supported by said bracket and having staggered legs extending therefrom, a head provided with staggered engaging prongs, terminals upon the legs having rib contact with the head back of the prongs and fastenings for holding the leg terminals to the head.

2. In an automatic train pipe connecter, a bracket, a yoke supported by said bracket and having staggered legs extending therefrom, a head having staggered engaging prongs, terminals upon the legs having rib contact with the head back of the prongs and fastenings for holding the leg terminals to the head.

3. In an automatic train pipe connecter, a bracket, a yoke supported by said bracket and having staggered legs extending therefrom, a head provided with staggered engaging prongs, terminals upon the legs having rib contact with the head at spaced points for each leg back of the prongs, forming staggered ribbed contacts and fastenings for holding the leg terminals to the head.

4. In an automatic train pipe connecter, a bracket, a yoke supported by said bracket, and having staggered legs extending therefrom, a head having staggered engaging prongs, terminals upon the legs having rib contact with the head at spaced points for each leg back of the prongs and fastenings for holding the leg terminals to the head.

5. In a train pipe connecter, a bracket, a head and a yoke, resilient connections between the bracket and head, a contact between the head and yoke being of rib type along spaced areas at the top and bottom of the head respectively and fastening devices for the yoke and head engaging them between the lines of contact.

6. In an automatic train connecter, a bracket having an opening extending transversely through its lower end, longer vertically than horizontally, a pivot across the opening having its cross section smallest at the middle and increasing toward each end, giving curved contours in longitudinal sections, a hook engaging said pivot, a threaded rod connected with the hook, a yoke having a forwardly facing surface at the rear engaging the rear face of the bracket, a spring engaging the rear of the yoke, a nut upon the rod adapted to compress the spring, a head carried by the yoke and train pipe terminals carried by the head.

EDWARD A. ROBINSON.